United States Patent [19]

Sonehara

[11] Patent Number: 4,870,484
[45] Date of Patent: Sep. 26, 1989

[54] COLOR DISPLAY DEVICE USING LIGHT SHUTTER AND COLOR FILTERS

[75] Inventor: Tomio Sonehara, Suwa, Japan

[73] Assignee: Seiko Epson Corporation, Tokyo, Japan

[21] Appl. No.: 36,204

[22] Filed: Apr. 8, 1987

Related U.S. Application Data

[63] Continuation of Ser. No. 608,677, May 10, 1984, abandoned.

[30] Foreign Application Priority Data

May 13, 1983 [JP] Japan ................................. 58-83696
May 13, 1983 [JP] Japan ................................. 58-83694
Dec. 19, 1983 [JP] Japan ................................. 58-23935

[51] Int. Cl.$^4$ .................... H04N 9/30; H04N 5/66; G02F 1/13; G09G 3/36
[52] U.S. Cl. ............................ 358/59; 340/784; 350/339 F; 350/345; 358/236
[58] Field of Search .................... 358/56, 58, 59, 61, 358/230, 236; 350/339 F, 345; 340/702, 784

[56] References Cited

U.S. PATENT DOCUMENTS

| | | | |
|---|---|---|---|
| 2,925,532 | 2/1960 | Larach | 358/59 |
| 3,840,695 | 10/1974 | Fischer | 358/61 |
| 4,011,001 | 3/1977 | Moriya | 350/345 |
| 4,183,628 | 1/1980 | Laesser et al. | 350/345 |

FOREIGN PATENT DOCUMENTS

| | | | |
|---|---|---|---|
| 53-83498 | 7/1978 | Japan | 340/784 |
| 58-88985 | 5/1983 | Japan | 358/58 |

OTHER PUBLICATIONS

A. G. Fischer, "Progress Toward TFT-Addressed TNLC Flat-Panel Color Television", *Nonemissive Electrooptic Displays*, Plenum Press, 1976, pp. 342-348.

J. C. Wood, "Optimized Wedge Illuminator for a Liquid-Filled Passive Display", *IBM Technical Disclosure Bulletin*, vol. 24, No. 11A, Apr. 1982, pp. 5368-5370.

*Primary Examiner*—James J. Groody
*Assistant Examiner*—Randall S. Svihla
*Attorney, Agent, or Firm*—Blum Kaplan

[57] ABSTRACT

A color display device particularly adapted for use in flat panel applications provides a bright picture with high saturation and excellent color reproduction. The color display device includes a light shutter mechanism which controls the amount of light passing therethrough. Color filters of different colors are disposed adjacent to the light shutter mechanism and include a plurality of color elements. Each color filter has a peak at the transmittance spectrum thereof. A light source illuminates the light shutter mechanism with the light source having peaks in a luminance spectrum adjusted to correspond to the peaks of the transmittance spectrum of each color filter.

28 Claims, 11 Drawing Sheets

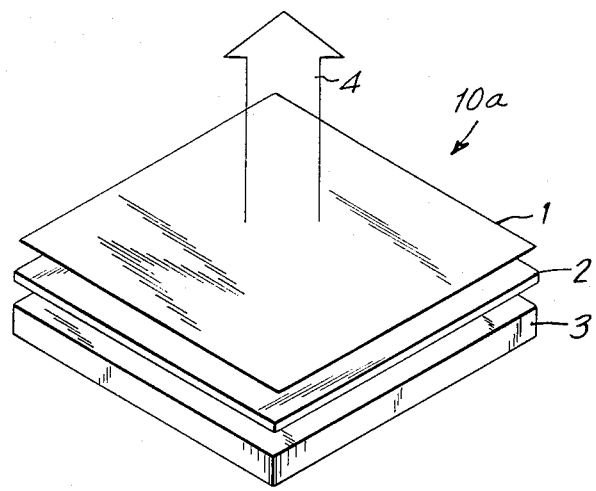
FIG. IA
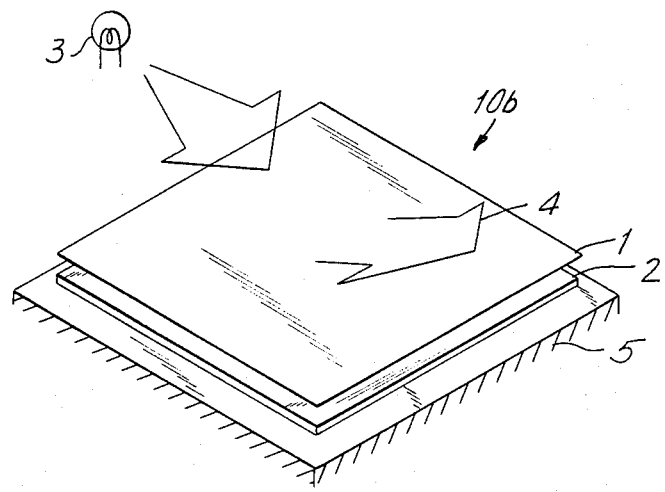
FIG. IB

FIG. 9B
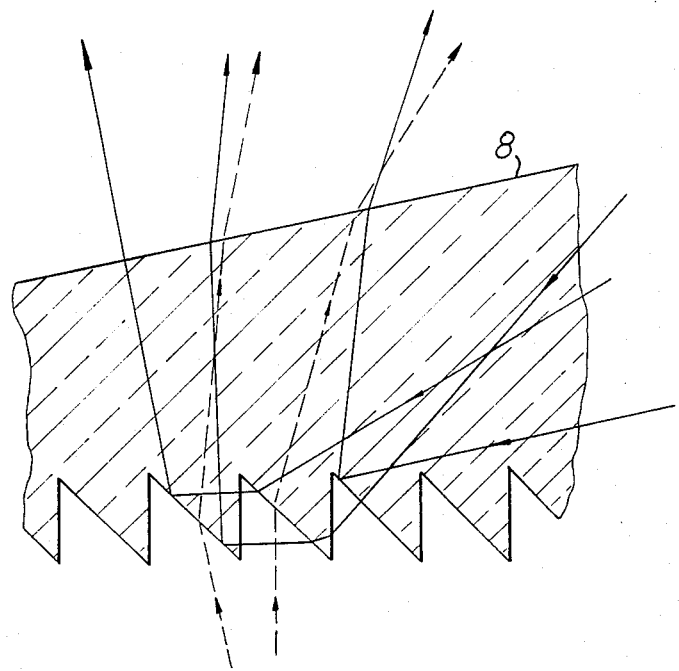
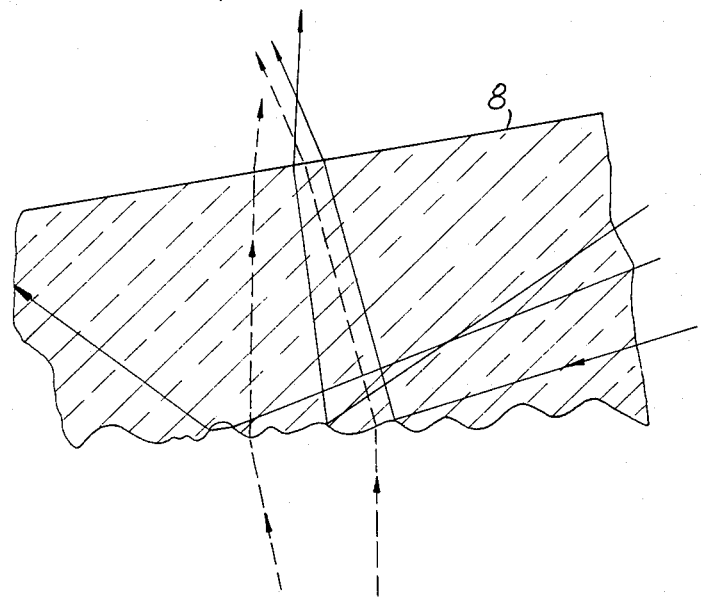
FIG. 9C

COLOR DISPLAY DEVICE USING LIGHT SHUTTER AND COLOR FILTERS

This is a continuation of application Ser. No. 608,677, filed May 10, 1984, now abandoned.

BACKGROUND OF THE INVENTION

The present invention is directed to a color display device and, in particular, to a color liquid crystal display device which utilizes a light source and color filters whose properties are selected to provide a high purity of color saturation and superior color reproduction.

Various types of color reproduction display screens or devices have been utilized over the years. The standard is a conventional cathode ray tube (CRT) which is utilized in television sets and other types of monitors. Cathode ray tubes are heavy and take up a lot of space where used.

Flat television screens or monitors have recently been proposed. One such type of flat television screen or display panel which utilizes a liquid crystal image display panel with integrated addressing circuitry is disclosed in U.S. Pat. No. 3,840,695. Advances have also been made in addressing liquid crystal flat-panel colored television display devices by utilizing a thin-film transistor matrix. See, for example, the article, A. G. Fischer, "Progress Toward TFT-Addressed TNLC Flat-Panel Color Television", pp. 342-348. "Nonemissive Electrooptic Displays" Plenum Press 1976. However, color reproduction in such devices has proven less than completely satisfactory.

Accordingly, it is desired to provide a color liquid crystal display device which improves upon color purity, saturation, and reproduction, heretofore unattainable in such flat-panel display devices.

SUMMARY OF THE INVENTION

Generally speaking, in accordance with the present invention, a color display device is provided. The color display device includes a light shutter mechanism which controls the amount of light transmitted thereto. Color filters are disposed adjacent the light shutter mechanism and include a plurality of color elements. A light source illuminates the light shutter mechanism and includes an illuminant having peaks in a wavelength range of transmitted spectrum of each of the color elements which acts as the light source.

The display device may be a liquid crystal display device wherein the light shutter mechanism utilizes the electro-optical effects of a liquid crystal material. The light source may be a fluorescent discharge tube, a cathode ray tube, an electro-luminescent light element, an LED or a vacuum fluorescent device. The light source may have luminous peaks in the wavelength ranges of red, blue, and green.

Accordingly, it is an object of the present invention, to provide an improved color display device.

Another object of the present invention is to provide an improved flat-panel color liquid crystal display device.

A further object of the present invention is to provide a color display device having a high purity of color in saturation and superior color reproduction.

Yet another object of the present invention is to provide a color liquid crystal display device which shows bright and high saturation and excellent color reproduction by combining color filters with a light source which has peaks in each wavelength range corresponding to red, blue, and green.

Still other objects and advantages of the invention will in part be obvious and will in part be apparent from the specification.

The invention accordingly comprises the features of construction, combination of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 1A is a schematic perspective view of a color liquid crystal display device of the transmittance type;

FIG. 1B is a schematic perspective view of a color liquid device of the reflective type;

FIGS. 9B and 9C are schematic views of the light guide plate.

DESCRIPTION OF THE PREFERRED EMBODIMENTS

Figure 2A:
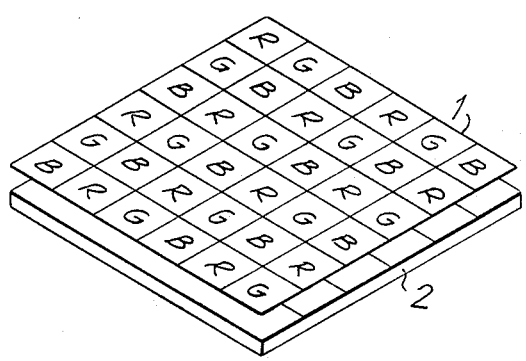
FIG. 2A is a schematic perspective view of color filters utilizing the additive mixture of colors.

Reference is first made to FIGS. 1A and 1B which depict full color display devices generally indicated at 10a and 10b, respectively. Display devices 10a and 10b include a light shutter 2 which may be a liquid crystal light shutter, a color filter 1 adjacent thereto, and a light source 3. Output light 4 is modulated according to display information. Color device 10b in FIG. 1B includes a reflector 5. Various types of constructions of transparent-type full color liquid crystal display devices wherein a light source is provided at the back of a liquid crystal light shutter as depicted in FIG. 1A have been proposed. In addition, reflective type devices wherein a light source is provided in front of a light shutter as depicted in FIG. 1B have also been proposed heretofore.

Figure 2B:
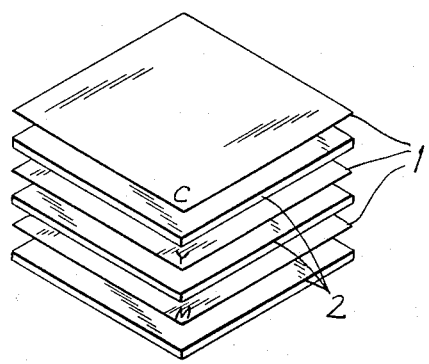
FIG. 2B is a schematic perspective view of color filters utilizing the subtractive mixture of colors.

FIG. 2A and 2B show arrangements of color filters and light shutters. FIG. 2A shows a case utilizing an additive mixture of colors and FIG. 2B show a case using a subtractive mixture of colors. In FIG. 2A, R(red), G(green) and B(blue) colors are arranged dispersively on one planar surface. On the other hand, in FIG. 2B, C(cyan), Y(yellow) and M(magenta) are superimposed on each other. In both cases, unnecessary wavelength ranges from a light source having a spectrum of flat intensity are attenuated by using color filters and a light shutter for modulating the incident light according to input information and a desirable spectrum can be formed according to color and brightness gained from display information.

Generally, in the above color filters, dye and pigment are utilized as materials thereof and these materials have the characteristic that the wavelength thereof is selectively specified.

Figure 3A:
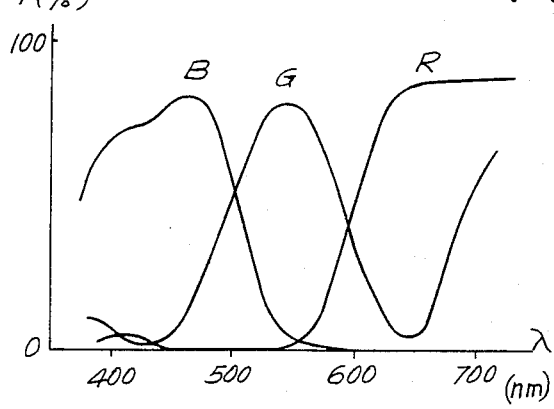
FIG. 3A is a graph depicting the characteristics of transmittance of color filters of red (R), green (G), and blue (B)

As shown in FIG. 3A, the wavelengths of the color filters in accordance with the invention are particularly selected so that the transmittance characteristics for each of the three wavelengths is broad and has no sharp peak. Furthermore, the transmittance curves cross each other at values of more than 30%. The broad, non-sharp peaks, however, make it difficult to reproduce color having high saturation.

Figure 3B:
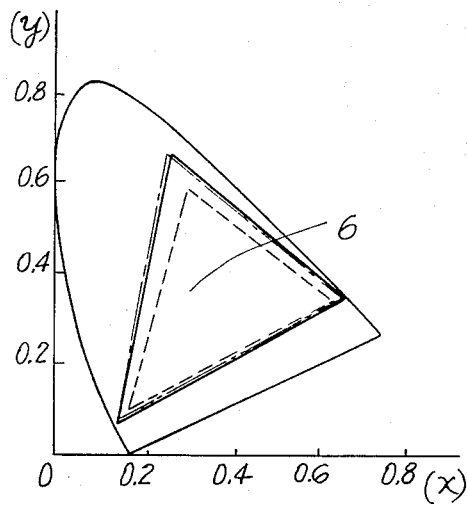
FIG. 3B is a graph showing the range of color specifications on the CIE color coordinates.

In a color liquid crystal display device based on the above principles, it has been such that a light source having a flat spectrum was the most desirable for color reproduction. Generally, a light source having a flat spectrum as the above is CIE standard illuminant C. However, when using a light source having a flat spectrum, a range of color reproduction is restricted by performance of the color filters of such a device. In FIG. 3B, the broken line shows a range of color reproduction of a system which combines R, G, and B filters with the CIE standard illuminant C, and the dot and dashed line shows that of a color CRT. As shown by FIG. 3B, both systems do not show sufficiently complete color reproduction. In particular, in the case of using color filters, it is impossible to reproduce color having a high saturation, i.e., color similar to that having monochromatic light, for absorption of color matter is used. In addition, the color specification range thereof is narrow.

Figure 4:
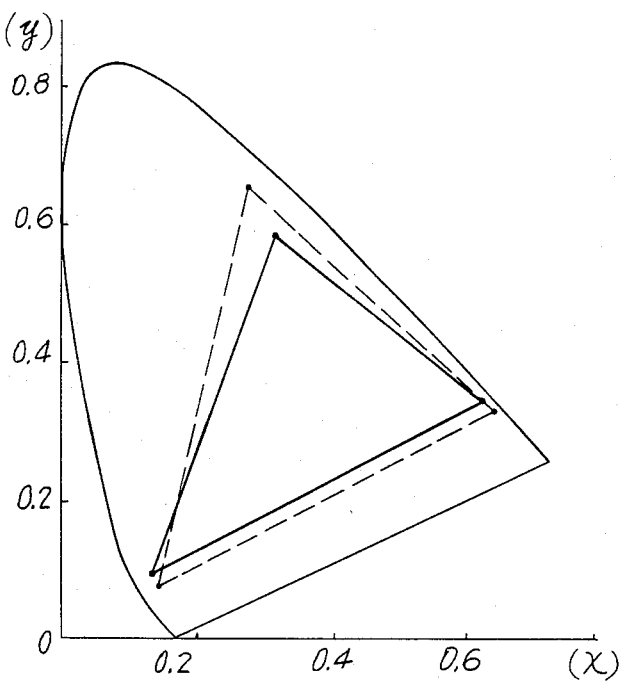
FIG. 4 is a graph showing the range of color specifications on the CIE color coordinates utilizing "x" and "y"

FIG. 4 is a comparison of color specification of color filters with that of a color CRT. In this color specification system denoted by the "x" and "y" coordinates, when the positions of "x" and "y" are close to the outside of the "horseshoe" depicted in FIG. 4, the color thereby becomes more pure like saturation monochromatic light. Furthermore, the range surrounded by the triangle made by the three primary colors shows a range of color synthesized by these three primary colors. It is desirable to have the larger triangle to obtain favorable color reproduction. In the case of a color CRT shown by the dashed line in FIG. 4, a favorable color reproduction can be obtained due to the sharp peaks in a fluorescent luminous spectrum. On the other hand, in the case of color filters, the range of color reproduction is strictly limited within the range denoted by the solid line in FIG. 4 since it is easy to have a more broad transmittance spectrum shown in FIG. 3A which is yielded by light absorption of dye and pigment. Further, in the method using color filters, there is another problem that when selecting dye or pigment satisfying heat resistance and light resistance properties, the purity of the colors becomes lowered and the color specification thereof is even more restricted.

A fundamental principle of the present invention is that even if the transmitted spectrum of color filters is broad, the luminous spectrum of the light source is provided so as to correspond to the transmittance of the color filters. Thereby, primary colors having high purity in color saturation can be obtained.

Figure 5:
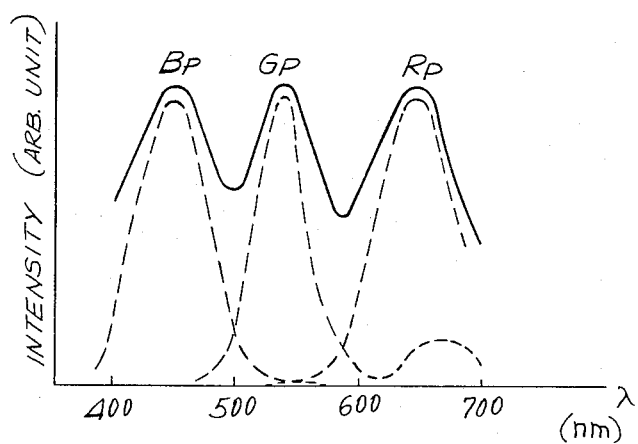
FIG. 5 is a graph depicting the luminous spectra of a light source utilized in conjunction with the present invention.

FIG. 5 depicts one of the embodiments of the spectral properties of a light source utilized in the present invention. In this embodiment, a light source showing three peaks $R_p$, $G_p$, and $B_p$ which are more sharp than the peaks R, G, and B of color filters as shown in FIG. 3A. This spectrum of such a light source is adjusted so as to produce white light. For example, as for G, the spectrum of light which outputs from color filters has a narrower band than the spectrum of the light source. The broken line in FIG. 5 shows the three basic colors, R, G, and B produced after that light is outputted from color filters. On account of such principles as described above, even though the purity of color filters in color saturation is insufficient, characteristics of the light source compensate for the insufficiency to improve the purity of color saturation.

As described above, the present invention offers the following principle, namely, that a white light source is obtained by the compounding of peak luminous spectra of the three basic colors and, further, characteristics of the peak luminous spectra thereof are combined with transmittance of color filters. Then, it becomes possible to realize further bright color reproduction.

More particularly, the peaks of the transmittance spectrum curves for red color filter R green color filter G and blue color filter B are adjusted to occur at approximately the same frequency as the red wavelength peak $R_p$, green wavelength peak $G_p$ and blue wavelength peak $B_p$ of the light source, respectively. With peaks $R_p$, $G_p$ amd $B_p$ matched to the relative poaks of the transmittance spectrum curves of color filters R, G and B, respectively, the luminance spectrum of the light source passing through these color filters is faithfully reproduced. Therefore, although there may be no sharp peak in the transmittance spectrum curves of color filter R, color filter G and color filter B, as shown in FIG. 3A, reproduction of colored light having a high saturation is achieved by these filters.

As also shown in FIG. 3A, the transmittance spectrum curves of red color filter R and green color filter G cross at about 500 nm at a transmittance level greater than 30%. The transmittance spectrum curves of green color filter G and blue color filter B cross at about 600 nm at a transmittance level greater than 30%. By providing that these cross points are at transmittance levels of greater than 30%, the amount of light transmitted through the filters results in a bright colored image being produced.

The above principles can also be applied to the subtractive mixture of colors. In the case of using a color filter having an additive mixture of colors, three types of lights whose peaks are in the range of R, G, and B respectively are mixed and added together. And, in the case of using the subtractive mixture of colors, the components of R, G, and B ranges from a white light source are subtracted in order. Thus, if the light source has three peak intensities and narrow bands in R, G, and B ranges, it is possible to gain output light having narrow band monochromatic color from a color filter, even if this filter is the type of Y, C, and M. Embodiments of the present invention will now be described.

Figure 6A:
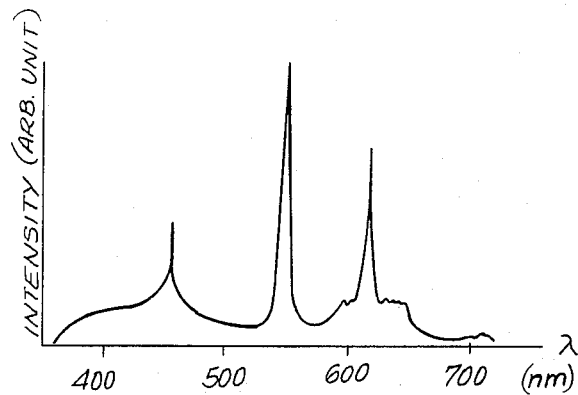
FIG. 6A is a graph depicting an embodiment of the present invention utilizing the luminous spectrum of a fluorescent tube having three peaks in the wavelength range thereof.
Figure 6B:
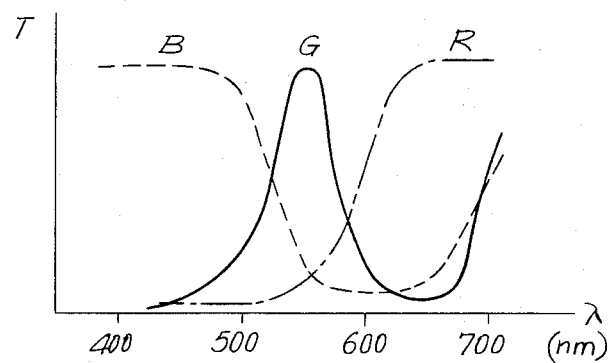
FIG. 6B is a graph depicting the spectrum after light from a light source is transmitted through color filters.

FIG. 6A shows the luminous spectrum of a fluorescent tube having three peaks in a wavelength range thereof. As shown by FIG. 6A, the fluorescent tube has three sharp peaks in each wavelength range of R, G, and B. FIG. 6B shows the transmittance of three types of color filters, R, G, and B.

Figure 7:
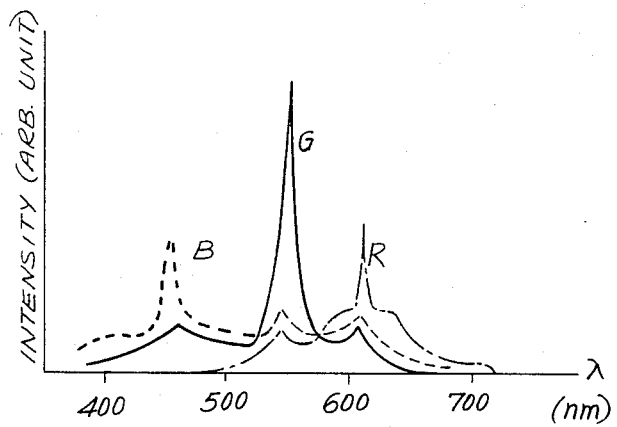
FIG. 7 is a graph showing the characteristics of a luminous spectrum of the three basic colors red (R), green (G), and blue (B) after light from a light source is transmitted through color filters of the type shown by FIG. 3A wherein a fluorescent tube having three peaks in the wavelength range thereof as depicted in FIG. 6A is utilized as a light source.

FIG. 7 shows the spectrum of light which is outputted from three color filters when the light source system having the characteristics shown in FIG. 6A is used.

In FIG. 7, the dot and dashed line refers to R, the solid line refers to G, and the broken line refers to B. When a fluorescent tube having three peaks in a wavelength range thereof is used, as shown by FIG. 7, the light which is outputted from the color filters can show three sharp intensities so that the three primary colors having high saturation can become visible. By using the above primary or basic color system, the range of colors which can be reproduced are broadened. In FIG. 3B, the range surrounded by a solid line shows the color specification range of the spectrum shown in FIG. 7. This range surrounded by the solid line is broader than that surrounded by a broken line (CIE-C light source) and equal to the range surrounded by the dot and dashed line (color CRT).

It is possible to vary the wavelength of the luminous peak according to various types of fluorescent material used therein. However, in order to produce white light, the fluorescent tube has peaks around 610 nm, 540 nm, and 450 nm corresponding to wavelength ranges of R, G, and B, respectively. Almost all of the above fluorescent tubes can be applied in the present invention. FIG. 6A also shows the characteristics of a fluorescent tube having three peaks in a wavelength range thereof.

The above is a description using R, G, and B transmitting types of color filters with a fluorescent tube. It is also possible to utilize a system which shows superior saturation and excellent color reproduction, even if the color filters of saturative mixture colors such as Y, C, and M are used. In the case of using color filters of the additive mixture of colors, three types of light of which peaks are in the range of R, G, and B, respectively, are mixed and added together. In the case of using the subtractive mixture of colors, the components of R, G, and B range from the white light source are subtracted in order. Thus, if a light source has three peak intensities and narrow bands in the R, G, and B range, it is possible to gain output light having narrow band monochromatic color from color filters, even if this filter is of the type Y, C, and M.

Figure 8A:
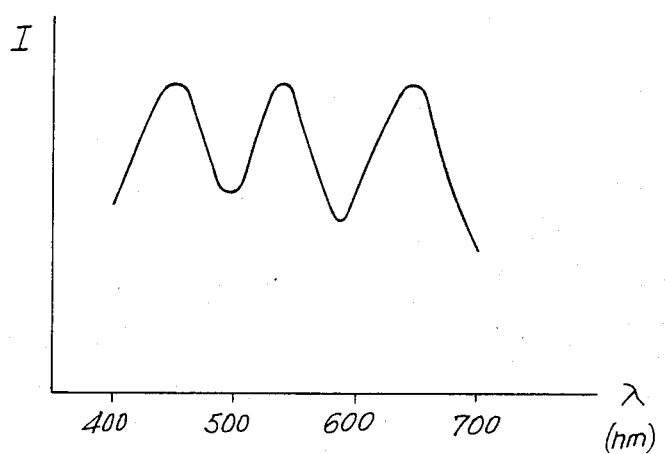
FIG. 8A is a graph depicting one of the embodiments of a luminous spectrum in the case where a CRT is utilized as a light source.

FIG. 8A shows a luminous spectra in the case of using a CRT as a light source. As shown in FIG. 8A, the above luminous spectrum has peaks corresponding to each wavelength range of R, G, and B. This is realized by providing that light sources for the R luminousness, G luminousness, and B luminousness are arranged in one picture element or such that fluorescent materials corresponding to R, G and B are compounded and applied to a fluorescent screen.

Also, in the case of using a CRT as a light source, compared with a light source having a flat spectrum, saturation depends not only on performance of color filters but also on characteristics of luminousness of a light source and therefore it is possible to realize high saturation purity and superior reproduction of color.

In the same manner as above, the luminous spectrum of an electro-luminescence light device can also have sharp peaks in each range of R, G, and B range by arranging some dopants and thereby the same effect as that of the display device using a fluorescent tube having three peaks in the wavelength range thereof or a CRT can be obtained. As described above, according to the present invention, it is advantageous in that superior colormetric purity and brightness can be reproduced since the luminous characteristics in a narrow band of light source works more effectively without depending upon the performance of the color filters.

Accordingly, any light source having peaks in the ranges of R, G, and B is available for use in the present invention so that other light sources except those described specifically herein are available.

Figure 8B:
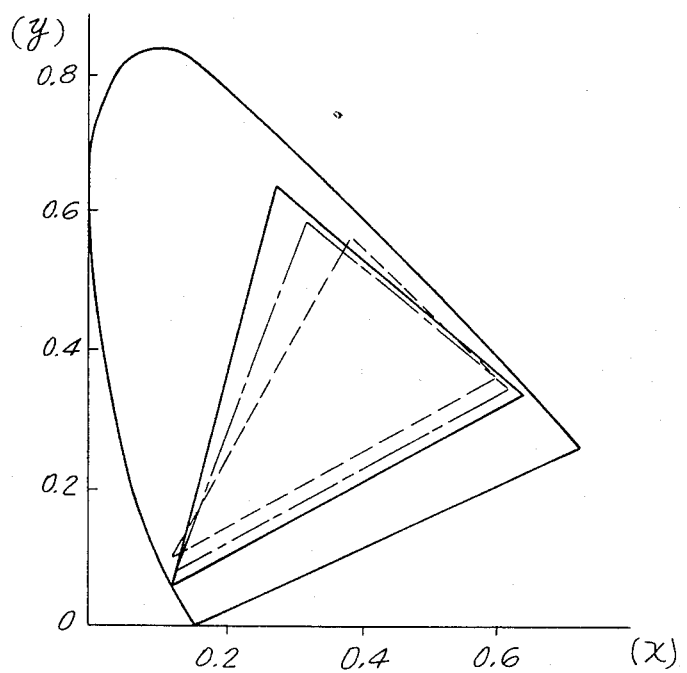
FIG. 8B is a graph depicting the range of color specification in the case where the color filters represented in FIG. 3A are combined with different kinds of light sources.
Figure 9A:
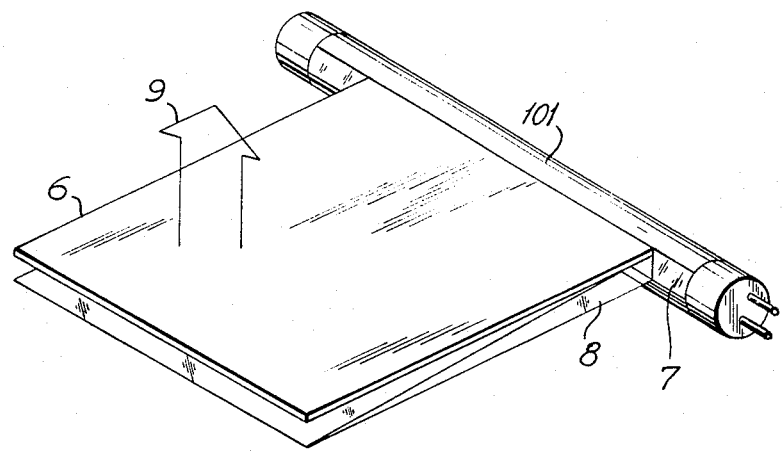
FIG. 9A is a schematic perspective view showing a color display device in which a fluorescent tube having three peaks in a wavelength range thereof and a liquid crystal light shutter are utilized.

FIG. 8B shows the color specification ranges of three types of light sources where color filters referred to in FIG. 3A are used. In FIG. 8B, the solid line shows the color specification range of a fluorescent tube having three peaks in a wavelength range thereof, the broken line shows the color specification range of a conventional white light fluorescent tube to which calcium halophosphate is applied and the dot and dashed line shows the color specification range of CIE standard illuminant C. As shown in FIG. 8B, in the case of using a conventional white light fluorescent tube, the color specification range thereof is narrow and poor in color reproduction In the case of using a fluorescent tube having three peaks in the wavelength range thereof as a light source, the color specification range is broader than that of CIE standard illuminant C having a standard broad spectrum FIG. 9A is a perspective view showing a color display device in which the above principles are applied. In FIG. 9A, the device includes a liquid crystal light shutter 6 having the electro-optical effects of a liquid crystal, a fluorescent tube 7 having three peaks in a wavelength range thereof, and a light guide plate 8 made from a transparent resin. One of each of R, G, and B color filters is placed on each of the separate picture elements which is compound of a liquid crystal light shutter.

Figure 9D:
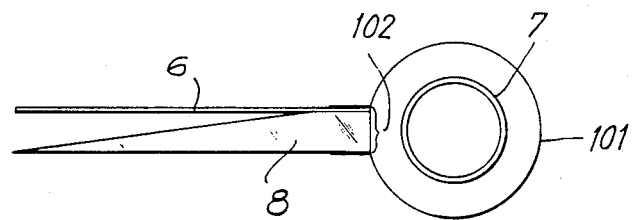
FIG. 9D is a schematic view of plane light source which has a reflective plate.

FIGS. 9B and 9C are schematic views of the light guide plate 8. Luminous flux from a fluorescent tube (solid arrow in FIGS. 9B and 9C) is reflected and/or refracted and becomes a planar light source. External light flux (broken arrow in FIGS. 9B and 9C) is transmitted through the transparent light guide plate and thereby it becomes possible to get the external light effectively. Concerning the shape of the section of the light guide plate, it is most efficient that the shape of the light guide plate is a wedge like as a whole and the section thereof is saw shape. However, other shapes are also available. The most important things are mentioned below. Namely, one is that refractive index of the materials is larger than environment and the other is that light is reflected at the boundary surface. And further, it is very effective to use an aperture type and reflected type fluorescent tube in order to improve the effect of getting flux from the fluorescent tube. As shown in FIG. 9D, the same effect as the above is expected by getting light to the aperture 102 using the reflector 101. The light from the planar light source is transmitted to the liquid crystal light shutter and the color filters. In this embodiment, the liquid crystal light shutter controls the intensity of incident light thereto according to the level of video signals applied and light 9 emitted from the elements is in color. Thus, a full color display can be obtained. In this embodiment, a fluorescent tube having three peaks in a wavelength range thereof is used and, as shown by FIG. 8B, it is possible to reproduce remarkable, clear, full color picture images.

Figure 10:
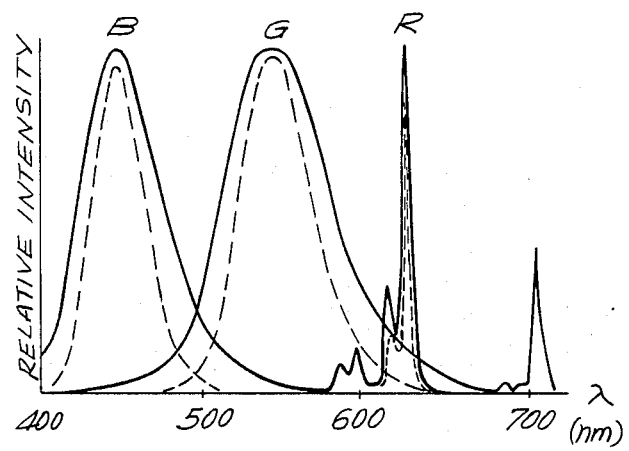
FIG. 10 is a graph depicting a luminous spectra.

In FIG. 10 the solid line shows the relative luminous spectrum of a CRT having three peaks in a wavelength range thereof used as a light source. This luminous spectrum has peaks corresponding to each wave length range of R, G, and B. This CRT is formed by the compounding fluorescent materials for a color display like P22(JEDEL) and applying them to a tube, or arranging point light sources of R, G, and B of a size which is equal to or smaller than a picture element. The broken line in FIG. 10 shows the spectrum of the light emitted from the three primary colors R, G, and B. As described above, when using a CRT having three peaks of R, G, and B as light sources, it becomes possible to provide a transmitted light spectrum having a narrower band than that of the color filter in FIG. 3A and thereby the three primary colors having high saturation are gained. In this case, there is no need to focus or make high accurate convergence of the CRT, it being sufficient to obtain just the illumination of the CRT by a scanning electron beam.

Figure 11:
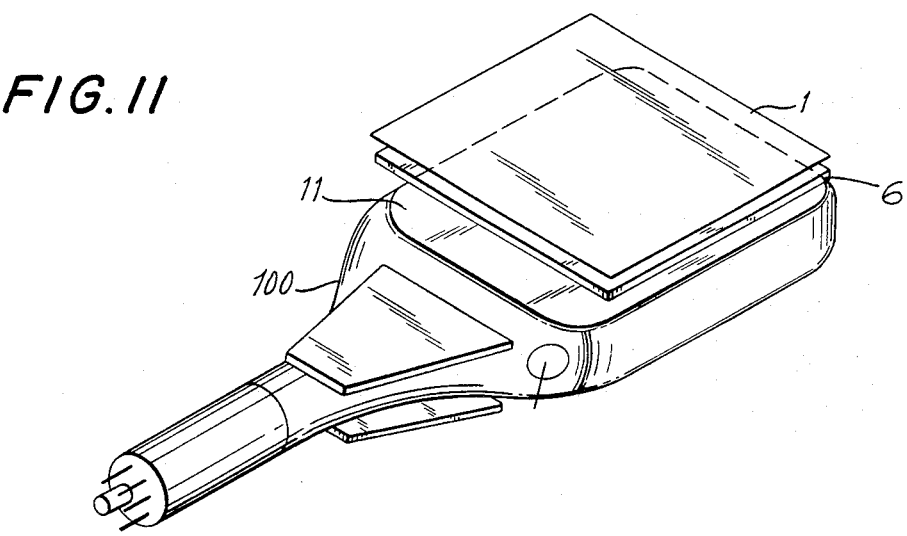
FIG. 11 is a perspective view showing a liquid crystal color display device in which a CRT having three peaks in a wavelength range thereof is utilized as light source.

FIG. 11 is a perspective view showing a liquid crystal display device in which a flat type CRT 100 having three peaks R, G, and B in each wavelength thereof is used as a light source. In FIG. 11, fluorescent materials of R, G, and B are compounded and then applied to face plate 11 and thereby a white light source is obtained. This white light source has a luminous spectrum shown in FIG. 10 so that, combined with the characteristics of the color filters described above, clear colors can be reproduced.

In addition, an electro-luminescent device can also be used like the above in which the luminous spectrum has three peaks of R, G, and B. In this embodiment, AC powder EL is used. In this device, it is possible to illuminate the three peaks of R, G, and B by using fluorescent materials including ZnS with the following dopants shown in Table I.

TABLE I

| composition | luminescent color |
| --- | --- |
| ZnS:Cu | red |
| ZnS + CdS:Cu, Br | red |
| ZnS:Cu, Al | green |
| ZnS:Cu, Cl | blue |

In the above AC powder EL, the compositions of the fluorescent materials and dopants are dispersed into the high permittivity materials like cyano-ethyl-cellulose or the like and, then, this material is sandwiched between electrodes on both sides. When the fluorescent material in the dopants are composed in a specific ratio, the light source having peaks in each wavelength range of R, G, and B can be obtained.

In the same manner as using a CRT, the EL light source obtained by the above has more superior color reproduction than the light source having a flat spectrum.

Figure 12:
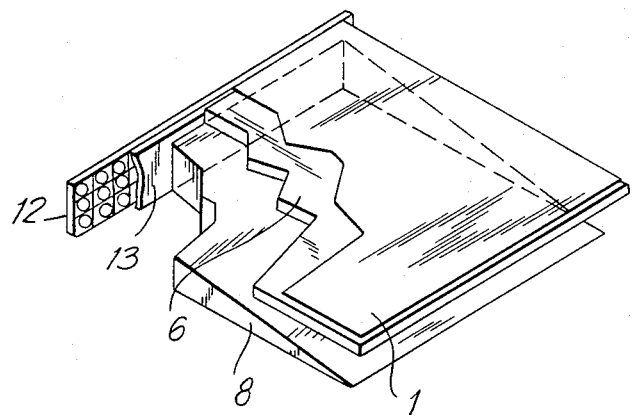
FIG. 12 is a detailed sectional and broken view showing a liquid crystal color display device in which a LED is utilized as a light source.

FIG. 12 is a detailed portion cross-sectional and broken view showing another liquid crystal display device using LED (light emitting diode) as a light source. As shown in FIG. 12, the LED has an array in order to obtain luminescence and simplify wirings therein. In the LED, three kinds of compositions shown in the following Table II are used.

TABLE II

| color | material | peak wavelength (nm) |
| --- | --- | --- |
| red | GaAsi—xPx | 640 |
| green | GaP:Zn | 565 |
| blue | SiC | 480 |

Figure 13:
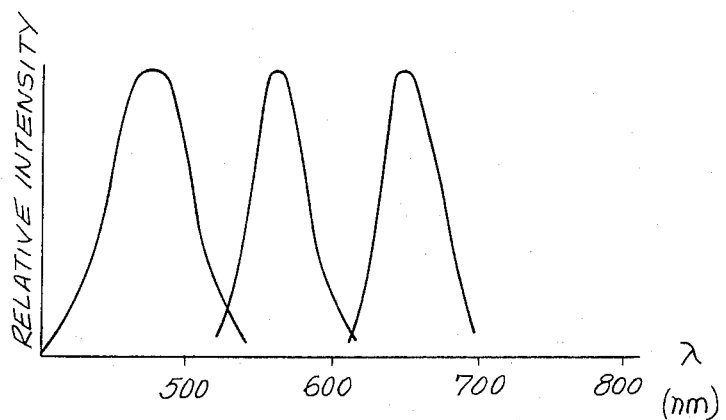
FIG. 13 is a graph showing the luminous spectrum of LED.

In this embodiment, the light emitted from the LED arrays is mixed by a light diffuser 13 and becomes a flat light source by means of light guide plate 8. This flat light source as the white light source transmits to liquid crystal shutter 6. R, G, and B color filters are placed on each picture element and therefore a full color display can be obtained. The LED has the luminescence spectrum shown in FIG. 13. In the case of combining the spectrum with transmittance of color filter shown in FIG. 3A, the white light source is realized to produce the three basic colors of even narrower bands and thereby the saturation and color reproduction are improved.

Figure 14:
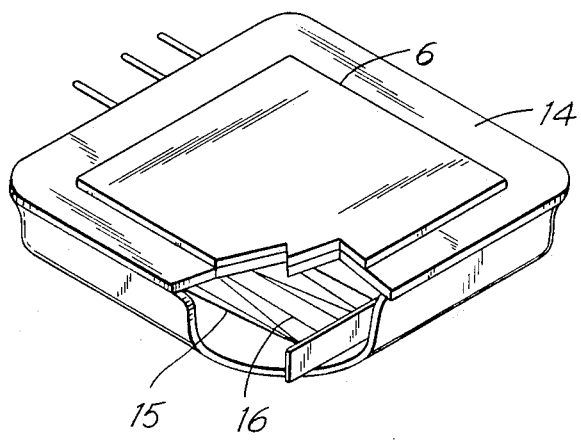
FIG. 14 is a detailed sectional and broken view showing a liquid crystal display device in which a vacuum fluorescent device (VFD) is utilized as a light source.

FIG. 14 shows an example using a fluorescent vacuum device (VFD) using low speed excited electrons. The VFD can provide a white light source by applying the following fluorescent materials to the inner surface of a face plate 14 as shown in Table III.

TABLE III

| color | composition | peak wavelength (nm) |
| --- | --- | --- |
| red | ZnCdS:Ag+In$_2$O$_3$ | 665 |
| green | ZnS:Au, Al+In$_2$O$_3$ | 555 |
| blue | ZnS:Ag+In$_2$O$_3$ | 450 |

As shown in FIG. 14, the VFD has a structure in which thermions from a filament 15 are accelerated by the accelerating electrode 16 and thereby the fluorescent materials applied to the inner surface plate are excited. This structure of the VFD is, in substance, the same as that of the fluorescent tube.

Figure 15:
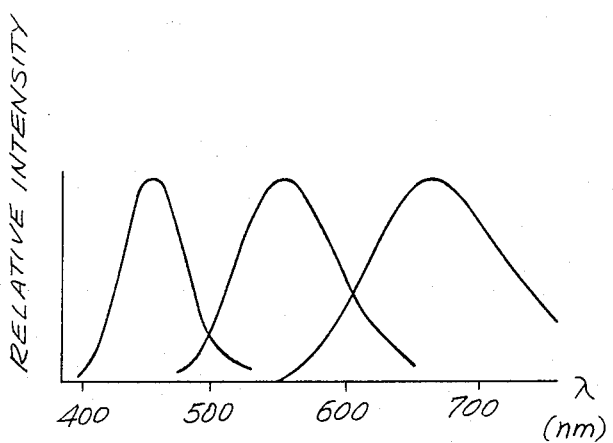
FIG. 15 is a graph showing the luminous spectrum of a VFD.

FIG. 15 is the luminous spectrum of the light source of the VFD shown in FIG. 14. Combining with the transmittance of color filters shown in FIG. 3A, each of the luminous spectra R, G, B is narrowed still more and thereby the saturation and color reproduction are improved.

As described above, according to the present invention, by combining transmittance of the color filters with the luminous spectra of the light source, the luminous spectra R, G, and B come to have even more sharp peaks, and, as a result, the saturation and color reproduction are improved. Accordingly, in order to obtain a white light source, the following two methods can be considered. First, the R, G, and B luminous sources are arranged flat on a plate and then the light from these sources are mixed by a light diffuser panel. Second, the fluorescent materials can be compounded first and then the light mixed so that R, G, and B are emitted.

Figure 16:
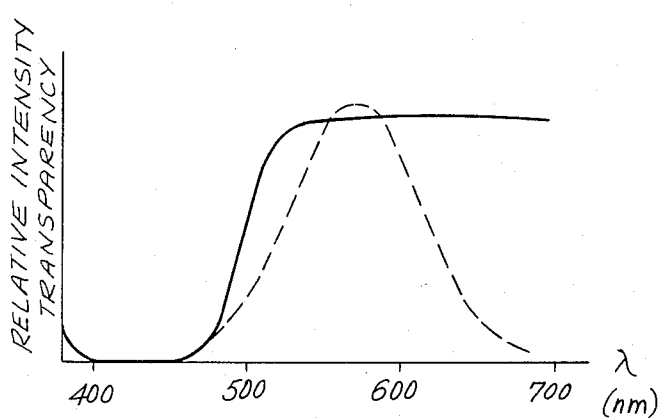
FIG. 16 is a graph showing other luminous spectra.

The above embodiments are descriptions of light sources having luminous peaks in the wavelength ranges of R, G, and B. However, the present invention is also available for other color display devices like monochromatic or plural color displays. For example, if a color filter having transmittance as shown by the solid line in FIG. 16 is utilized, a yellow display device can be realized. Furthermore, when using a light source having a peak luminous spectrum which corresponds to the transmittance of the color filter as shown by the broken line in FIG. 16, the luminous spectrum of the color produced thereby is narrower than that of the color filter. As a result, high saturation is expected and it is possible to obtain superior yellow color reproduction.

In the above embodiments, each of the light shutters has a device using the electro-optical effect of liquid crystal, for example in the TN mode, guest-host mode, dynamic scattering mode and the like. And, in the above devices, the light shutters are driven by a multiplexing method or active device array or the like. However, other types of light shutters can also be used in the present invention. For example, a light shutter having a device using the electro-optical effects of crystals such as lead titanante, lanthanum zirconate or the like or that having a device using the electro-optical effect of ferro-electric ceramic, or that having a device using the chromic effect or that driven by a mechanical plate rotation or transfer or the like can be utilized.

Furthermore, other types of light sources are also available for the present invention, if such light sources modulate the transmittant spectrum of the color filters.

According to the present invention, it is advantageous in that the specified narrow band of transmittant spectrum of color filters can be remarkably improved by using a light source having a peak level of spectrum corresponding to the main band of spectrum of these color filters. Moreover, according to the present invention, it is possible to realize a favorable illuminance of color purity, even if the band of transmittant spectrum of color filters is broadened by the materials of dye or pigment of the color filters. Thus, the relatively low cost color display device with high reliability can be obtained.

The present invention of a color display device according to this invention is particularly effective in the field of the full color image display when superior color reproduction is required.

It will thus be seen that the objects set forth above, among those made apparent from the preceding description, are efficiently attained and, since certain changes may be made in the above contructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A color display device comprising light shutter means for controlling the amount of light passing therethrough, a color filter comprising a plurality of red, blue and green filter elements disposed adjacent to said light shutter means, said red, blue and green color filter elements being characterized by respective transmittance spectrum curves having respective peaks, and light source means for illuminating said light shutter means, said light source means being characterized by a luminance spectrum having peaks corresponding to the peaks of the transmittance spectrum surves of said red, blue and green color filter elements, wherein the transmittance spectrum curves of said red and green color filter elements cross at about 500 nm and the transmittance spectrum curves of said green and blue color filter elements cross at about 600 nm, and wherein the light transmittance of said red, green and blue color filter elements at these crossings is greater than 30%.

2. The color display device as claimed in claim 1, wherein said light source means has a luminance spectrum with three peaks in wavelength ranges of red, blue, and green.

3. The color display device as claimed in claim 2, wherein said light shutter means uses the electro-optical effects of a liquid crystal to control the amount of light transmitted therethrough.

4. The color display device as claimed in claim 2, wherein said light source means includes a fluorescent discharge tube having a luminance spectrum with three peaks in wavelength ranges of red, blue and green.

5. The color display device as claimed in claim 2, wherein said light source means includes a cathode-ray tube.

6. The color display device as claimed in claim 2, wherein said light source means includes an electroluminescent light element.

7. The color display device as claimed in claim 2 wherein said light source means includes light emitting diodes.

8. The color display device as claimed in claim 2, wherein said light source means includes a vacuum fluorescent device.

9. The color display device as claimed in claim 1, wherein said light shutter means uses the electro-optical effects of a liquid crystal to control the amount of light transmitted therethrough.

10. The color display device as claimed in claim 9, wherein said light source means includes a fluorescent discharge tube having a luminance spectrum with three peaks in wavelength ranges of red, blue and green.

11. The color display device as claimed in claim 9, wherein said light source means includes a cathode-ray tube.

12. The color display device as claimed in claim 9, wherein said light source means includes an electroluminescent light element.

13. The color display device as claimed in claim 1, wherein said light source means includes light emitting diodes.

14. The color display device as claimed in claim 9, wherein said light source means includes a vacuum fluorescent device.

15. The color display device as claimed in claim 1, wherein said light source means includes a fluorescent discharge tube having a luminance spectrum with three peaks in wavelength ranges of red, blue and green.

16. The color display device as claimed in claim 1, wherein said light source means includes a cathode-ray tube.

17. The color display device as claimed in claim 1 wherein said light source means includes an electroluminescent light element.

18. The color display device as claimed in claim 1, wherein said light source means includes light emitting diodes.

19. The color display device as claimed in claim 1, wherein the light source means includes a vacuum fluorescent device.

20. The color display device as claimed in claim 1, wherein said light source means has a luminance spectrum with three peaks of about 610 nm, 540 nm and 450 nm.

* * * * *

UNITED STATES PATENT AND TRADEMARK OFFICE
CERTIFICATE OF CORRECTION

PATENT NO. : 4,870,484
DATED : September 26, 1989
INVENTOR(S) : Tomio Sonehara

It is certified that error appears in the above-indentified patent and that said Letters Patent is hereby corrected as shown below:

Column 5, line 8, change "red color filter R" to

-- blue color filter B --; and line 11, change "blue color filter B" to

-- red color filiter R--.

Column 10, line 19, change "surves" to -- curves --;

line 21, change "red" to -- blue --; and line 23, change "blue" to -- red --.

Signed and Sealed this

Third Day of September, 199

Attest:

BRUCE LEHMAN

Attesting Officer

Commissioner of Patents and Trademarks